(12) United States Patent
Heimroth et al.

(10) Patent No.: US 10,584,805 B2
(45) Date of Patent: Mar. 10, 2020

(54) VALVE ACTUATING SYSTEM

(71) Applicant: FESTO AG & Co. KG, Esslingen (DE)

(72) Inventors: Marcel Heimroth, Denkendorf (DE); Markus Dreher, Stuttgart (DE); Michael Kanthack, Wimsheim (DE)

(73) Assignee: FESTO AG & CO. KG, Esslingen (DE)

( * ) Notice: Subject to any disclaimer, the term of this patent is extended or adjusted under 35 U.S.C. 154(b) by 175 days.

(21) Appl. No.: 15/661,419

(22) Filed: Jul. 27, 2017

(65) Prior Publication Data
US 2018/0038509 A1     Feb. 8, 2018

(30) Foreign Application Priority Data
Aug. 2, 2016 (DE) .................. 10 2016 214 252

(51) Int. Cl.
*F16K 37/00*     (2006.01)
*F15B 15/28*     (2006.01)
(Continued)

(52) U.S. Cl.
CPC ...... *F16K 37/0008* (2013.01); *F15B 15/2807* (2013.01); *F15B 21/003* (2013.01);
(Continued)

(58) Field of Classification Search
CPC ......... Y10T 137/8242; Y10T 137/8275; F16K 37/0008; F16K 37/0016; F16K 37/0025;
(Continued)

(56) References Cited

U.S. PATENT DOCUMENTS 3,142,995 A * 8/1964 Forrest ............... F16K 37/0016
                                                           74/10.54
3,186,423 A * 6/1965 Davidson ............... G01N 9/18
                                                           137/91
(Continued)

FOREIGN PATENT DOCUMENTS

CN     102878302 A     1/2013
CN     203500629 U     3/2014
(Continued)

OTHER PUBLICATIONS

Search report from corresponding Chinese Patent Application No. 201710651113.1, pp. 1-3, dated Jan. 17, 2019.

*Primary Examiner* — William M McCalister
(74) *Attorney, Agent, or Firm* — Hoffmann & Baron, LLP

(57) ABSTRACT

In a valve actuating system having an actuating drive which has a drive housing and an output unit which is movably mounted in the drive housing for generating a stroke of a spindle of a valve for opening or closing a through-flow opening of the valve, wherein the output unit has a force pickup portion to which the spindle is coupleable or coupled and a fastening portion arranged opposite the force pickup portion, wherein the actuating drive furthermore possesses a holder, which is separate from the output unit, has a holder longitudinal-axis and has a fastening device by way of which it is fastened to the fastening portion of the output unit and a support device for supporting at least one position information element on the holder, and wherein the valve actuating system has a plurality of mutually different types of position information elements supported on the holder by way of the support device.

17 Claims, 4 Drawing Sheets

(51) Int. Cl.
*F16K 31/122* (2006.01)
*F15B 21/00* (2006.01)
*F16K 27/02* (2006.01)

(52) U.S. Cl.
CPC .......... *F16K 27/02* (2013.01); *F16K 31/1221* (2013.01); *F16K 37/0033* (2013.01); *F15B 15/28* (2013.01); *Y10T 137/8275* (2015.04)

(58) Field of Classification Search
CPC ............. F16K 37/0033; F16K 37/0041; F16K 37/0058; F16K 37/0066; F16K 37/0075; F16K 37/0083; F15B 15/28; F15B 15/2807; F15B 15/2815; F15B 15/2823; F15B 15/2853; F15B 15/2861; F15B 15/2869; F15B 15/2876; F15B 15/2892; F15B 21/003
USPC ..... 137/554, 556; 73/1.79, 1.81, 54.14, 314, 73/1.23
See application file for complete search history.

(56) References Cited

U.S. PATENT DOCUMENTS

| | | | | |
|---|---|---|---|---|
| 3,443,365 | A * | 5/1969 | Lee | B01D 35/143 96/421 |
| 3,680,967 | A * | 8/1972 | Engelhardt | B01L 3/5453 356/246 |
| 3,936,794 | A * | 2/1976 | Beaudoin | G01N 27/12 338/34 |
| 3,994,163 | A * | 11/1976 | Rogers | E21B 47/02224 73/152.56 |
| 4,046,350 | A * | 9/1977 | Massey | F16K 31/1635 251/58 |
| 4,206,455 | A * | 6/1980 | Isakson | F15B 15/2807 116/272 |
| 4,432,246 | A * | 2/1984 | Granat | G01L 1/04 73/862.53 |
| 4,579,123 | A * | 4/1986 | Chen | G10K 11/02 600/459 |
| 4,787,070 | A * | 11/1988 | Suzuki | A61B 8/4281 181/400 |
| 5,031,660 | A * | 7/1991 | Magee | F16K 37/0041 137/554 |
| 6,135,147 | A * | 10/2000 | Peters | F16K 37/0008 137/552 |
| 7,513,395 | B2 * | 4/2009 | Labinski | B67D 3/044 137/588 |
| 2002/0157713 | A1 * | 10/2002 | Pimouguet | F16K 37/0058 137/554 |
| 2010/0024543 | A1 * | 2/2010 | Knowles | G01F 23/2961 73/290 V |
| 2011/0088794 | A1 * | 4/2011 | Cavagna | F23K 5/007 137/557 |
| 2011/0095215 | A1 * | 4/2011 | Larsson | F02D 9/105 251/129.01 |
| 2011/0226046 | A1 * | 9/2011 | Giardino | G01N 3/303 73/82 |
| 2011/0290332 | A1 * | 12/2011 | Soldo | F16K 37/0033 137/15.01 |
| 2012/0080628 | A1 * | 4/2012 | Buergi | F16K 31/605 251/249.5 |
| 2013/0025703 | A1 * | 1/2013 | Steadman | B60K 15/04 137/315.01 |
| 2014/0053925 | A1 * | 2/2014 | Esche | F16K 37/0041 137/554 |
| 2014/0069532 | A1 * | 3/2014 | Obata | G06F 3/046 137/554 |
| 2014/0166131 | A1 * | 6/2014 | Adams | F16K 31/122 137/551 |
| 2014/0167745 | A1 * | 6/2014 | Held | G01B 21/045 324/207.12 |

FOREIGN PATENT DOCUMENTS

| | | |
|---|---|---|
| CN | 105221828 A | 1/2016 |
| DE | 10241977 | 4/2004 |
| DE | 102013111663 | 6/2014 |
| DE | 102015105483 | 10/2016 |
| EP | 1503181 | 2/2005 |
| EP | 1643175 A2 | 4/2006 |
| EP | 2341270 | 10/2012 |
| WO | WO2015149898 A1 | 10/2015 |
| WO | WO2016037795 A1 | 3/2016 |

\* cited by examiner

VALVE ACTUATING SYSTEM

BACKGROUND OF THE INVENTION

The invention relates to a valve actuating system having an actuating drive which has a drive housing and an output unit which is movably mounted in the drive housing for generating a stroke of a spindle of a valve for opening or closing a through-flow opening of the valve, wherein the output unit has a force pickup portion to which the spindle is coupleable or coupled and a fastening portion arranged opposite the force pickup portion, wherein the actuating drive furthermore possesses a holder, which is separate from the output unit, has a holder longitudinal-axis and has a fastening device by way of which it is fastened to the fastening portion of the output unit and a support device for supporting at least one position information element on the holder, and wherein the actuating drive comprises at least one position information element.

A valve actuating system of the type mentioned at the outset is known for example from U.S. Pat. No. 6,135,147. The valve actuating system disclosed therein possesses a checking and monitoring device for checking and monitoring the position of a valve element of a valve. The checking and monitoring device can be fastened to the upper end of a valve shaft by way of an ISO or NAMUR interface. The checking and monitoring device possesses a housing, in the circumferential wall of which openings are formed, which are orientated offset from one another in the circumferential direction and in which magnets are inserted in each case. The magnets correspond to associated proximity switches, whereby it is possible to detect the position of the valve element by way of the movement of the valve rod and the proximity of the magnets to the associated proximity switch. Mechanical display means are furthermore provided for visually displaying the position of the valve shaft.

A valve actuating system of the type mentioned at the outset is furthermore known from EP 2 341 270 B1. A rotary drive is provided, having a rotating shaft on the upper end of which a position detecting device is arranged for detecting the position of the shaft. A magnet, which cooperates with a stationary magneto-resistive sensor, is arranged on the shaft, whereby the angular position of the rotating shaft can be detected. A mechanical display is furthermore provided, which is likewise mounted at the upper end of the shaft and therefore rotates together with the shaft. The mechanical position display and the electric position display and magneto-resistive sensor are incorporated together.

SUMMARY OF THE INVENTION

The object of the invention is to provide a valve actuating system of the type mentioned at the outset, which is more economical and may be used more flexibly than conventional valve actuating systems.

The valve actuating system according to the invention is notable in that the actuating drive has a plurality of mutually different types of position information elements, which may be optionally held on the holder by way of the support device.

The holder having the support device is formed to be multifunctional so that it can optionally support mutually different types of position information elements. Exchanging one position information element for another which is different therefrom is therefore possible in an easier and quicker manner. The valve actuating system possesses a high modularity and, by using a suitable position information element, can be adapted to different requirements in terms of detecting the position of the output unit of the actuating drive.

In a further development of the invention, the position information elements differ from one another in terms of the manner in which the position information is provided.

In a particularly preferred manner, the support device is designed for the tool-free fastening of the associated position information element on the holder. This enables different position information elements to be exchanged quickly for one another to adapt to different conditions.

In a further development of the invention, the support device is designed in such a way that the associated position information element is held on the holder with form fit using form-fit means and/or with force-fit using force-fit means.

In a particularly preferred manner, the support device has a support portion on which a plurality of holding elements are formed, which, for all types of position information elements to be supported, are used in particular together for supporting the respective position information element.

It is therefore expedient that the holding elements used are not different holding elements matched individually to the position information element to be supported, but are instead multifunctional holding elements and serve to support all of the position information elements to be held.

In a particularly preferred manner, depending on the type of position information element to be supported, the holding elements execute different holding functions established using form and/or force fit.

In a further development of the invention, the support portion has an in particular plate-shaped base portion from which the holding elements project such that they are aligned in particular axially to the holder longitudinal-axis of the holder.

The holding elements are particularly preferably arranged on the base portion such that they are distributed in the circumferential direction with respect to the holder longitudinal-axis, in particular in equal portions from one another, and together form an in particular cylindrical receiving space for an associated position information element which is in particular cylindrical in form.

In a particularly preferred manner, the holding elements are formed as in particular elastically flexible holding fingers. In the case of an in particular cylindrical receiving means formed by the holding elements, the position information element can therefore be introduced in a simple manner by bending the holding fingers apart, wherein these snap back into their starting position again after the introduction of the position information element.

It is possible that the holding elements, in particular holding fingers, grouped in the circumferential direction have radially inwardly aligned latching lugs which, when a position information element is inserted into the receiving space, reach over a latching portion formed there for forming a form-fitting support in a first holding function and, with another position information element equipped with counter-holding fingers and counter-latching lugs, are latched to the counter-latching lugs in a second holding function.

In a further development of the invention, the fastening device of the holder has a shaft portion which is arranged in particular coaxially to the support portion and on which fastening means for fastening to the drive unit are located.

In a particularly preferred manner, the fastening means comprise a thread which may be screwed to a corresponding counter-thread on the output unit. The thread is expediently formed as an external thread formed on the lateral surface of the shaft portion. The counter-thread is correspondingly provided on the output unit as an internal thread which is arranged in a threaded hole and into which the external thread can be screwed.

In a further development of the invention, the holder is formed as a single-piece component. It goes without saying that it is also conceivable to form the holder in several parts, for example to form the support portion and the shaft portion as mutually separate components and to connect them to one another by way of suitable fastening means. With this variant, it would be possible for example to combine differently dimensioned support portions with differently dimensioned shaft portions so that, in accordance with the modular design principle, an adaptation to differently dimensioned position information elements and also to differently dimensioned output-side fastening means, for example to different diameters of threaded boreholes, is possible.

In a particularly preferred manner, the holder is made of plastics material; in particular it is formed as a plastics injection-moulded part. This enables the holder to be produced economically.

In a further development of the invention, the output unit has an output piston, which is in particular acted upon fluidically and is coupled to an output rod of the output unit, wherein the force pickup portion and the fastening portion for fastening the holder are located on the output rod.

In a particularly preferred manner, a magnet which is in particular cylindrical in form and is insertable or inserted in the receiving space, is formed by the position information elements. The magnet is expediently formed as a permanent magnet.

In a further development of the invention, a display element, which is formed as a mechanical, in particular cap-shaped, display element and is equipped with the counter-holding fingers and counter-latching lugs, is formed by the position information elements. The display element can have a display portion which is equipped with a signal colour, for example red.

BRIEF DESCRIPTION OF THE DRAWINGS

A preferred exemplary embodiment of the valve actuating system according to the invention is illustrated in the drawing and will be explained in more detail below. The drawing shows.

DETAILED DESCRIPTION

Figure 1:
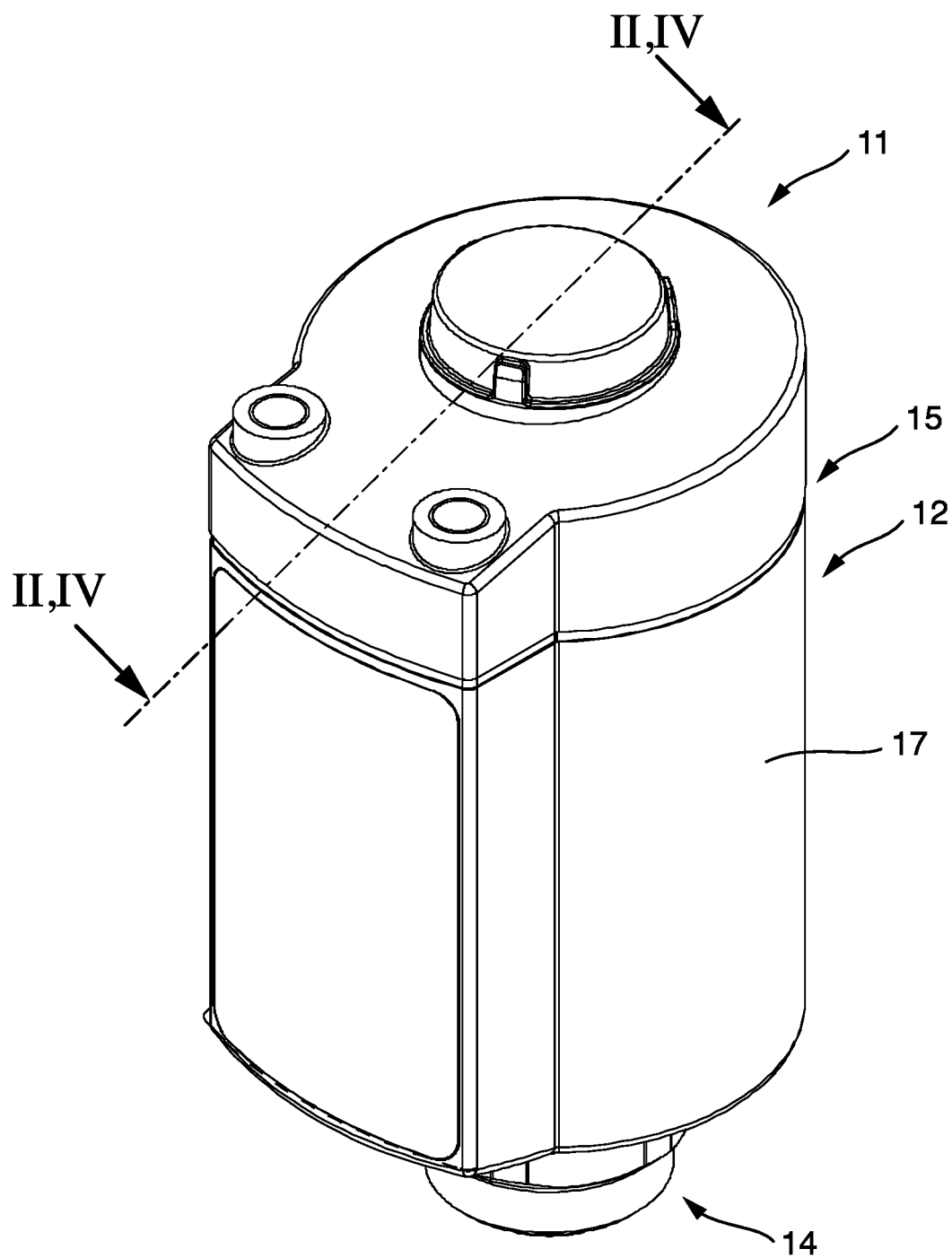
FIG. 1 a perspective view of a preferred exemplary embodiment of the valve actuating system according to the invention.

FIGS. 1 to 5 show a first exemplary embodiment of the valve actuating system according to the invention, which is denoted as a whole by the reference numeral 11.

The valve actuating system 11 comprises an actuating drive 12 for actuating a valve (not illustrated) which may be used to control a fluid flow. The valve is expediently also a constituent part of the valve actuating system 11.

The valve has a valve housing through which there passes a fluid channel in the course of which an overflow opening is located, a valve element being associated with said overflow opening. The valve element is linearly moveable and can be optionally positioned in a closed position closing the overflow opening or in at least one open position opening the overflow opening. In the open position of the valve element, a fluid can pass through the fluid channel. The flow rate depends on the open flow cross-section of the overflow opening at the time. The valve element or shut-off member is formed for example as a shut-off piston which is arranged at the end of a spindle and is provided with a seal. It goes without saying that it is also possible for the valve element to alternatively also have another form. For example, a valve element in the form of a diaphragm may be used, which can close the overflow opening by way of a pressure piece coupled to the spindle. In other words, the valve can also be formed as a diaphragm valve.

The actuating drive 12 has a longitudinal extent and accordingly an imaginary longitudinal axis 13. The actuating drive 12 has an axial output side 14, which faces downwards in the drawing, and, relative thereto, an axially opposed axial rear side 15, which faces upwards in the drawing. On the axial output side 14, the actuating drive 12 is equipped with a coupling device 16 with the aid of which it is fastenable or fastened to the valve, and more precisely in a releasable manner.

The actuating drive 12 has a drive housing 17 which, with the aid of the coupling device 16, is preferably releasably mountable or mounted on the valve housing. Accordingly, the drive housing 17 and the valve housing form a unified assembly in operation.

An output unit 18 of the actuating drive 12 extends in the interior of the drive housing 17, which output unit, through appropriate actuation, may be driven to perform a back and forth output movement 19, indicated by a double-headed arrow, which is a linear movement coinciding with the axial direction of the longitudinal axis 13. The output unit 18 cooperates drivingly with the valve element of the valve and is expediently axially movably coupled to the valve element, this being particularly in the region of the coupling device 16.

By way of example, the output unit 18 contains an output rod 20, which is axially movably coupled to a valve element formed as a shut-off piston or as a diaphragm, in particular to the spindle of the valve element, and which passes through a front end wall 21 of the drive housing 17 in a slidingly displaceable manner, said end wall being associated with the axial output side 14, and which, in a housing interior 22 of the drive housing 17, is connected to a drive piston 23 which is sealingly mounted in the housing interior 22 in a slidingly displaceable manner.

The drive piston 23 divides the housing interior 22 into a front housing chamber 24a facing the front end wall 21 and an axially opposed rear housing chamber 24b delimited in the region of the axial rear side 15 by a rear end wall 25 of the drive housing 17.

The output unit 18 may be acted upon by an actuating force to bring about the output movement 19. The type of actuating force depends upon the design of the actuating drive 12, wherein it can be generated completely electromechanically.

However, it is advantageous if the actuating drive 12 is a fluid-actuated and in particular a pneumatic actuating drive 12, which applies to the exemplary embodiment, so that the actuating force is the result of fluid acting on the drive piston 23.

The fluid-actuated actuating drive 12 can be a single-acting or double-acting design. A single-acting design is presented by way of example, wherein a spring device 26 arranged in the rear housing chamber 24b constantly acts on the output unit 18 in the direction of the front end wall 21, whereby the valve element is constantly acted upon in the closed position. An advantageously "normally closed" configuration is therefore present. By way of a first fluid control channel (not illustrated) which crosses the wall of the drive housing 17 and leads into the front housing chamber 24a, the front housing chamber 24a can be acted upon by a fluid pressure medium to move the output unit 18 in the direction of the rear end wall 25 and thereby at the same time bring the valve element into an open position.

Figures 2, 3:
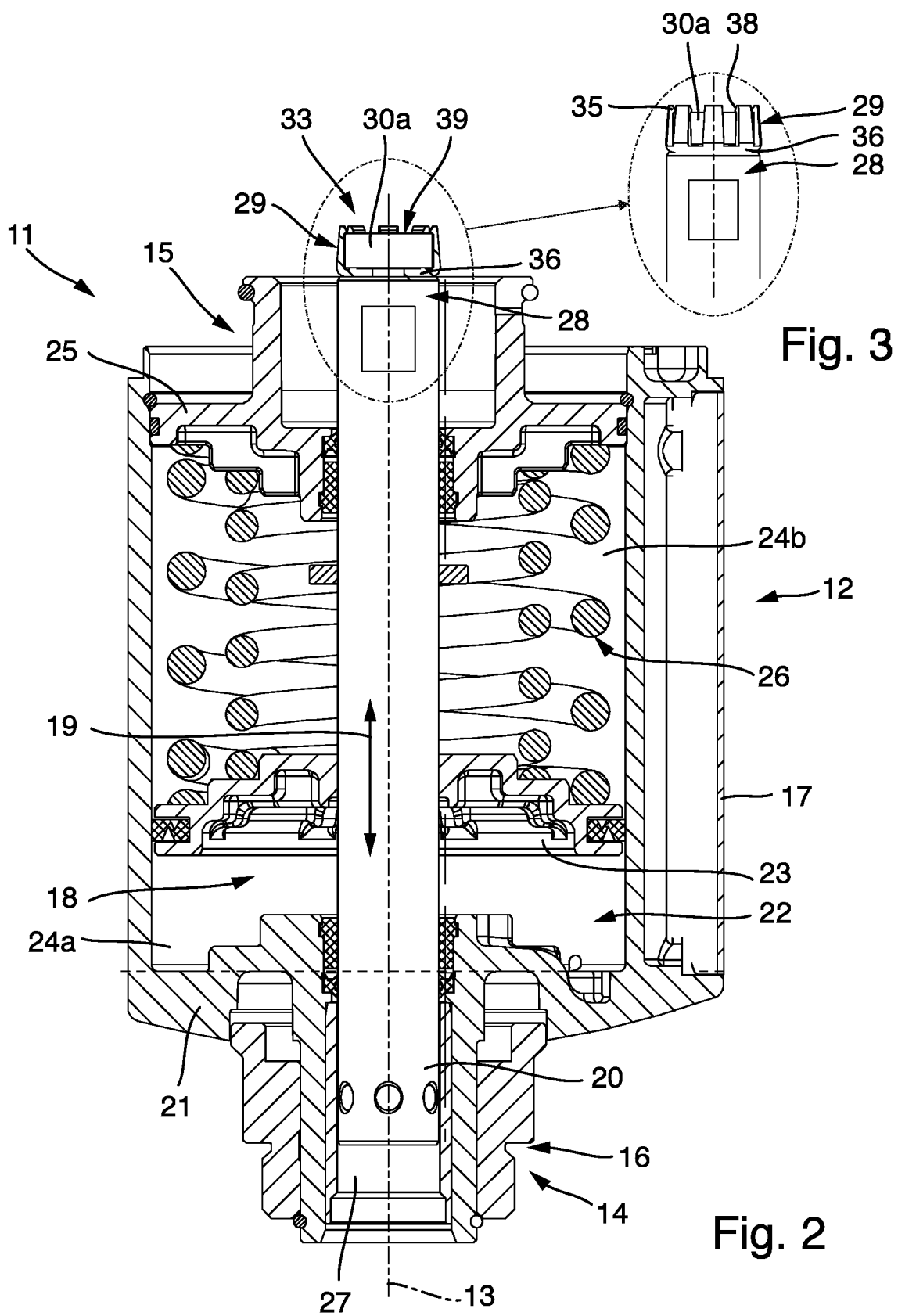
FIG. 2 a longitudinal section through the valve actuating system of FIG. 1 along the line II-II of FIG. 1 with the cover removed, wherein a first type of position information element is inserted.
FIG. 3 the detail X of FIG. 2 with a non-sectional view of the holder.
Figure 4:
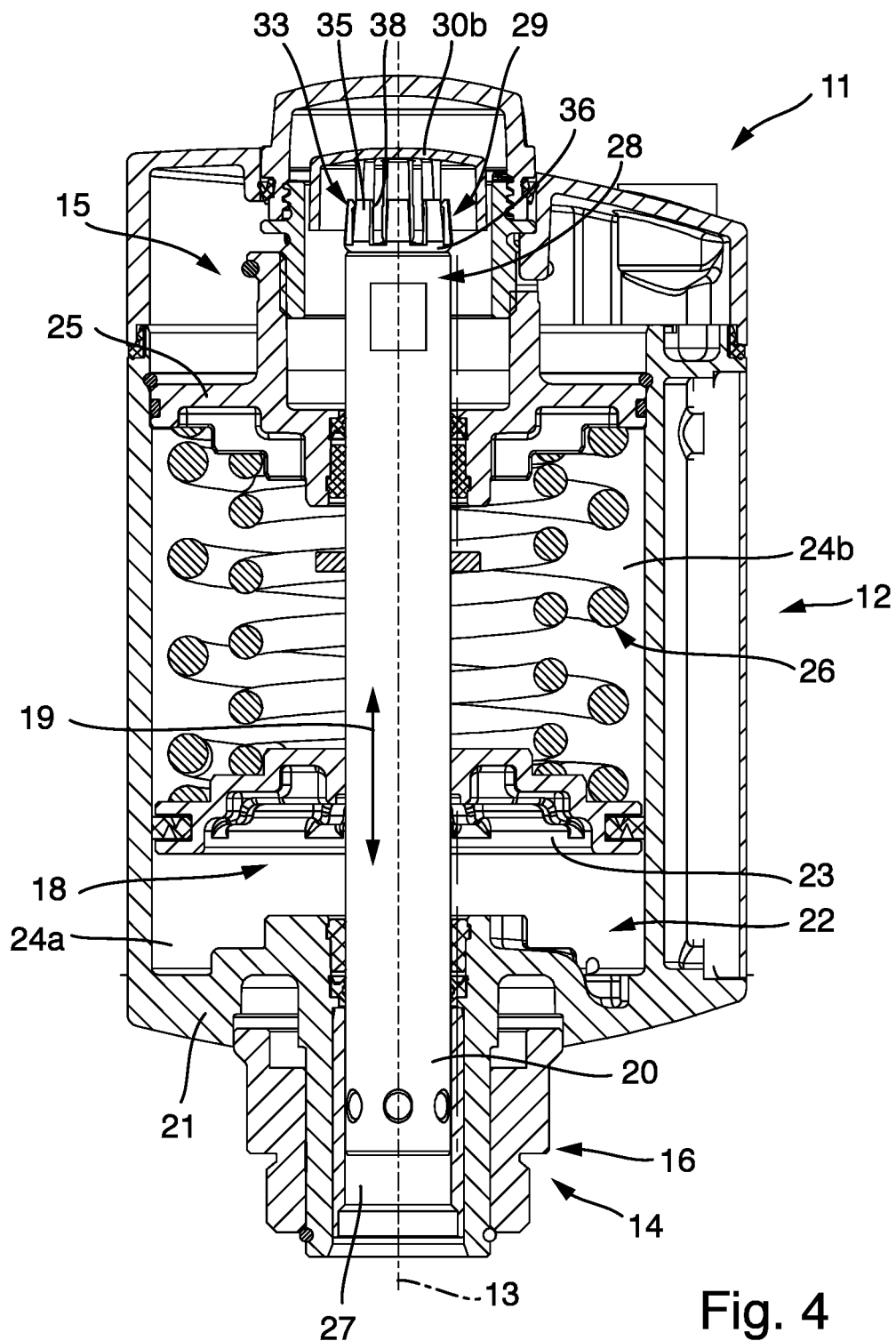
FIG. 4 a longitudinal section through the valve actuating system of FIG. 1 along the line IV-IV of FIG. 1, wherein a second type of position information element is inserted.

As illustrated in particular in FIG. 2, in the region of the front end wall 21 of the drive housing 17, the output rod 20 possesses a force pickup portion 27 to which the spindle (not illustrated) of the valve is coupleable or coupled. Opposite the force pickup portion 27, a fastening portion 28 for fastening a holder 29 is located in particular on the rear end, associated with the rear end wall 25, of the output rod 20, to which holder a position information element 30 is fastenable or fastened in a manner explained in more detail below.

Figure 5:
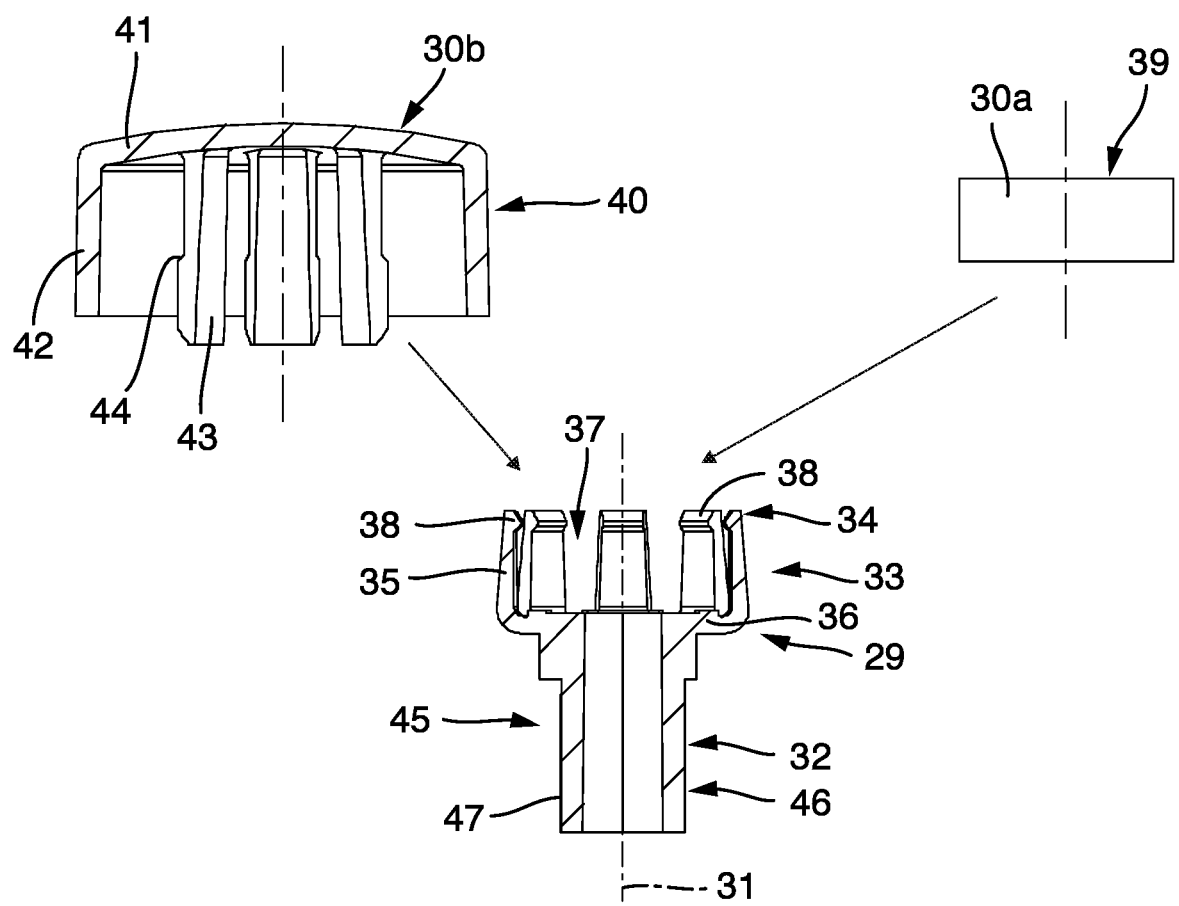
FIG. 5 a section through the holder of the valve actuating system of FIG. 1 in a separate illustration having two mutually different position information elements which may be fastened to the holder.

As illustrated in particular in FIG. 5, the holder 29 having a holder longitudinal-axis 31 possesses a fastening device 32 by way of which it is fastened to the fastening portion 28 of the output rod 20. The holder 29 furthermore possesses a support device 33 for supporting at least one position information element 30 on the holder 29.

The holder 29 is suitable for a plurality of mutually different types of position information elements 30a, 30b to be fastened to it, although optionally only one of the position information elements 30a, 30b is supported. The assembly unit of position information elements 30a, 30b, which, by way of example, is fitted with two, three or even more mutually different position information elements 30a, 30b, therefore enables the optional support of a particular position information element 30a, 30b of the assembly unit on the holder 29, whereby adaptation to the application is possible. For example, it would be conceivable in an Ex protection zone to revert to a non-electrical or magnetically acting position information element, for example a purely mechanical position information element.

According to a preferred exemplary embodiment, the holder 29 is a single-piece component and is expediently produced by plastics injection moulding.

The holder 29 has a cylindrical form as a whole, wherein it possesses a support portion 34 on which a plurality of holding elements 35 are formed.

As illustrated in particular in FIG. 5, the support portion 34 possesses a plate-shaped base portion 36 from which the holding elements 35 project such that they are aligned substantially axially to the longitudinal axis. The holding elements 35 are arranged on the base portion 36 such that they are expediently distributed at equal spacings from one another in the circumferential direction of the base portion 36 and together form a cylindrical receiving space 37 for an associated position information element 30a which is cylindrical in form. The holding elements 35 are formed as in particular elastically flexible holding fingers and each possess radially inwardly directed latching lugs 38, wherein the latching lugs 38 are arranged on the upper free end of the holding fingers.

As shown in particular in FIGS. 2 and 3, the latching lugs 38 together form a type of holding-down device for a position information element 30a introduced into the receiving space.

By way of example, the position information element 30a is shown in the form of a magnet, in particular a permanent magnet, which has a circular cylindrical form. The permanent magnet is a constituent part of a position detection device for determining the position of the output rod 20 and therefore, by way of the coupling by way of the spindle, the position of the valve element of the valve, which valve element is connected to the spindle. The position detection device furthermore possesses a proximity switch or proximity sensor (not illustrated). The proximity switch or proximity sensor is seated on a stationary portion of the actuating drive 12, for example on a cover (not illustrated in FIG. 3) connected to the drive housing 17. If the permanent magnet, which is moved with the output movement 19, moves into the region of the proximity switch or proximity sensor, a signal is generated which expediently correlates to the open position of the valve element, i.e. when a signal is emitted, the open position of the valve element has been detected.

The cylindrical magnet should be introduced into the receiving space 37 of the support portion 34 of the holder 29 for support. The holding fingers here are bent back radially outwards, whereby the magnet can be introduced into the receiving space 37. After passing the latching lugs 38, the holding fingers snap back into their starting position again, wherein the latching lugs 38 reach over a latching portion 39 formed on the magnet to form a form-fitting support. When the position information element 30a formed as a magnet is supported, the holding fingers execute a first holding function, and more precisely as a type of holding-down device for the permanent magnet received in the receiving space 37.

As an alternative position information element 30b, a mechanical cap-shaped display element is shown here by way of example. The display element, which can also be referred to as a display cap, is likewise cylindrical in form and possesses a cylindrical base portion 40 with a cover region 41 and a circumferential side wall 42. Counter-holding fingers 43, and more precisely expediently a number of counter-holding fingers 43 which corresponds to the number of holding fingers formed on the holder 29, are formed on the cover region 41 and project downwards from this in the position of use. The counter-holding fingers 43 likewise possess radially inwardly directed counter-latching lugs 44 in the region of their free ends. For support, the display element or the displace cap is brought towards the holder 29 in such a way that the holding fingers and counter-holding fingers 43 are aligned flush with one another on the display element. Following this, the display cap with its counter-holding fingers 43 is pressed downwards until the end faces of the counter-holding fingers 43 come to a stop against the base portion 36 of the holder 29. In this position, the previously radially outwardly expanded holding fingers snap back into their starting position again, wherein the counter-latching lugs 44 reach over the counter-holding fingers 43 and therefore ensure that the display cap is held on the holder 29.

With this support, the holding elements, in particular holding fingers, execute a second holding function, namely they each ensure the holding-down of an individually associated counter-holding finger 43 on the display cap.

As illustrated in particular in FIG. 5, the holder 29 possesses the fastening device 32 already mentioned. For fastening on the fastening portion 28 of the output rod 20, the fastening device 32 possesses a shaft portion 45, arranged coaxially to the support portion 34, on which fastening means 46 are located for fastening on the output rod 20. By way of example, the fastening means 46 comprise an external thread 47 on the shaft portion, which may be screwed in a threaded borehole (not illustrated) on the end face of the output rod 20. The holder 29 can therefore be screwed to the output rod 20 by way of the external thread 47.

The holder 29 is firstly expediently screwed to the output rod 20 without being fitted with a position information element 30 and the desired position information element 30 is then fastened to the holder 29. This is particularly expedient when supporting the position information element 30 formed as a display element. It goes without saying, however, that it would also be possible to fit the holder 29 with the associated position information element 30 beforehand and to then screw the complete structural unit comprising the holder 29 and position information element 30 to the output rod 20. This would be conceivable for example with a position information element 30a which is formed as a magnet.

What is claimed is:

1. A valve actuating system having an actuating drive which has a drive housing and an output unit which is movably mounted in the drive housing for generating a stroke of a spindle of a valve for opening or closing a through-flow opening of the valve, wherein the output unit has a force pickup portion to which the spindle is coupleable or coupled and a fastening portion arranged opposite the force pickup portion, wherein the actuating drive furthermore possesses a holder, which is separate from the output unit, the holder having a longitudinal-axis and further comprising a fastening device and a support device, the fastening device being fastened to the fastening portion of the output unit, and the support device supporting any one of a plurality of mutually different types of position information elements on the holder, wherein the valve actuating system comprises a plurality of mutually different types of position information elements, which may be optionally supported on the holder by way of the support device, and wherein the support device has a support portion on which a plurality of circumferentially-spaced holding elements are formed, the holding elements being used together for supporting the any one of plurality of mutually different types of position information elements to be supported, and wherein, depending on the type of position information element to be supported, the holding elements execute different holding functions established using form and/or force fit, and wherein the holding elements are formed as elastically flexible holding fingers.

2. The valve actuating system according to claim 1, wherein the position information elements differ from one another in terms of the manner in which the position information is provided.

3. The valve actuating system according to claim 1, wherein the support device is designed for the tool-free fastening of the associated position information element on the holder.

4. The valve actuating system according to claim 1, wherein the support device is designed in such a way that the associated position information element is held on the holder with form fit using form-fit means and/or with force-fit using force-fit means.

5. The valve actuating system according to claim 4, wherein the support portion has a plate-shaped base portion from which the holding elements project such that they are aligned axially to the holder longitudinal-axis.

6. The valve actuating system according to claim 5, wherein the holding elements are arranged on the base portion such that they are distributed in the circumferential direction with respect to the holder longitudinal-axis at equal spacings from one another, and together form a cylindrical receiving space for an associated position information element which is cylindrical in form.

7. The valve actuating system according to claim 1, wherein the holding elements comprise holding fingers grouped in the circumferential direction and have radially inwardly aligned latching lugs which, when a position information element is inserted into the receiving space, reach over a latching portion formed there for forming a form-fitting support in a first holding function and, with another position information element equipped with counter-holding fingers and counter-latching lugs, are latched to the counter latching lugs in a second holding function.

8. The valve actuating system according to claim 1, wherein the fastening device of the holder has a shaft portion which is arranged coaxially to the support portion and on which fastening means for fastening to the output unit are located.

9. The valve actuating system according to claim 8, wherein the fastening means comprise a thread which may be screwed to a corresponding counter-thread on the output unit.

10. The valve actuating system according to claim 9, wherein the thread is formed as an external thread formed on the lateral surface of the shaft portion.

11. The valve actuating system according to claim 1, wherein the holder is a single-piece component.

12. The valve actuating system according to claim 1, wherein the holder is made of plastic material.

13. The valve actuating system according to claim 12, wherein the holder is a plastic injection-moulded part.

14. The valve actuating system according to claim 1, wherein the output unit has a drive piston, which is acted upon fluidically and is coupled to an output rod of the output unit, wherein the force pickup portion and the fastening portion for fastening the holder are located on the output rod.

15. The valve actuating system according to claim 1, wherein a permanent magnet, which is cylindrical in form and is insertable or inserted in the receiving space, is formed by the position information elements.

16. The valve actuating system according to claim 1, wherein a display element, which is formed as a mechanical display element and is equipped with the counter-holding fingers and counter-latching lugs, is formed by the position information elements.

17. The valve actuating system according to claim 16, wherein the display element is cap-shaped and has a display portion equipped with a red signal colour.

* * * * *